US00RE42605E

(19) United States
(12) Reissued Patent
Noll et al.

(10) Patent Number: US RE42,605 E
(45) Date of Reissued Patent: Aug. 9, 2011

(54) METHOD FOR IMPROVING RF SPECTRUM EFFICIENCY WITH REPEATER BACKHAULS

(75) Inventors: John R. Noll, Satellite Beach, FL (US); Christopher J. Peters, Malabar, FL (US); Jeffrey W. Smith, Palm Bay, FL (US); Terry L. Williams, Melbourne Beach, FL (US)

(73) Assignee: Treble Investments Limited Liability Company, Wilmington, DE (US)

(21) Appl. No.: 12/191,866

(22) Filed: Aug. 14, 2008
(Under 37 CFR 1.47)

Related U.S. Patent Documents

Reissue of:
(64) Patent No.: 7,092,714
Issued: Aug. 15, 2006
Appl. No.: 10/074,514
Filed: Feb. 12, 2002

(51) Int. Cl.
*H04Q 7/20* (2006.01)

(52) U.S. Cl. ..... 455/446; 455/15; 455/41.2; 455/63.1; 370/310; 370/312; 370/339

(58) Field of Classification Search ..... 455/446, 455/41.2, 63.1; 370/310, 312, 339
See application file for complete search history.

(56) References Cited

U.S. PATENT DOCUMENTS 4,727,590 A 2/1988 Kawano et al.
5,771,017 A 6/1998 Dean et al.
6,049,315 A 4/2000 Meyer
6,124,824 A 9/2000 Xu et al.
6,188,875 B1 2/2001 Evans
6,345,188 B1 2/2002 Keskitalo et al.
6,577,869 B1 6/2003 Garrison
6,801,514 B2 10/2004 Ma
2001/0016504 A1 8/2001 Dam et al.
2002/0013164 A1 1/2002 Leifer et al.
2002/0045431 A1 4/2002 Bongfeldt
2002/0123365 A1* 9/2002 Thorson et al. ..... 455/524
2002/0147031 A1* 10/2002 Hood, III ..... 455/562
2002/0187813 A1 12/2002 Guo
2002/0193147 A1 12/2002 Li et al.
2003/0054813 A1 3/2003 Riley et al.
2005/0059342 A1 3/2005 Engels et al.

* cited by examiner

*Primary Examiner* — Patrick N Edouard
*Assistant Examiner* — Julio Perez
(74) *Attorney, Agent, or Firm* — Snell & Wilmer L.L.P.

(57) ABSTRACT

A spectrally efficient wireless communication system that includes a plurality of base stations communicating indirectly with a plurality of wireless communications devices through a plurality of repeaters. The method can generally comprise communicating indirectly between a first base station and a wireless communication device using a first repeater and a first RF backhaul link. A control processor associated with the first base station can control a first smart antenna system. The system selectively configures the first smart antenna system to spatially isolate communications on the first RF backhaul from communications on a second RF backhaul of a second repeater.

23 Claims, 4 Drawing Sheets

METHOD FOR IMPROVING RF SPECTRUM EFFICIENCY WITH REPEATER BACKHAULS

Matter enclosed in heavy brackets [ ] appears in the original patent but forms no part of this reissue specification; matter printed in italics indicates the additions made by reissue.

BACKGROUND OF THE INVENTION

1. Technical Field

The inventive arrangements relate generally to mobile telecommunications systems and more particularly to a more efficient use of RF spectrum allocation for repeater/base station backhaul links.

2. Description of the Related Art

In a wireless telecommunication system, a base station communicates with mobile communication devices via communication channels, known in the art as ground links. By itself, a base station can only cover a limited area with ground links. This limited coverage area is referred to in the art as a cell. Other devices, such as repeaters, are sometimes used to expand the range of a base station to cover a larger geographic area. To a limited extent, non-translating repeaters extend the range that a base station can cover within the same cell. A frequency translating repeater can provide coverage within the same cell or for a separate cell from the cell of its serving base station. Repeaters are typically placed beyond the range of a base station's ground link so as to expand the base station's service to cover those cells. A group of cells covered by a base station utilizing repeaters is known a cell cluster. The present invention applies generally to the class of repeaters known as frequency translating repeaters.

A backhaul communication link allows the base station to communicate with the repeaters for receiving and transmitting information to/from the mobile communications devices. Some base station units and repeaters are configured with a backhaul channel that operate "in band", i.e. in a portion of the limited frequency spectrum allocated for ground links. Other base stations may support the backhaul in a licensed or unlicensed band other than the band allocated for ground links. However, use of in unlicensed bands is typically undesirable due to interference from uncontrolled sources. Likewise availability of spectrum in a licensed band other than the band used for ground links may be limited as well as costly. In conventional systems, a different backhaul carrier frequency is required for communication between a base station and each associated frequency translating repeater. However, in systems that select the backhaul from a portion of the limited frequency spectrum allocated for ground links, such multiple backhaul frequencies reduce the available ground link bandwidth.

A base station may support a number of repeaters that are geographically distributed in any direction from the base station. The repeater would typically utilize a narrow beam antenna to receive downlink signals and transmit uplink signals to its serving base station. This narrow beam antenna focuses transmitted uplink signal to its serving base station and also limits interference to unintended base stations. However, the base station typically would employ an omni-directional or broad beam directional antenna that could support multiple backhauls to different geographically diverse repeaters. Because the downlink (base station-to-repeater) backhaul is transmitted in a broad direction rather than focused to the intended repeater, this broad transmission generates interference for unintended repeaters thus limiting spectral efficiency. Likewise, more power is required to be transmitted than would be necessary than if the base station antenna were using narrow beamwidth antenna. On the uplink the base station may receive a signal from an unintended repeater on the same frequency as an intended repeater.

Smart antenna systems are known in the art as a way for multiple communication links to improve spectral efficiency by spatially isolating those communications links from each other thus reducing interference. For example, switched beam systems are available that may consist of a plurality of narrow antenna beams arranged in a pattern to cover an omni-directional area. In switched beam systems, each antenna requires one or more dedicated transceivers and transmit amplifiers together with associated RF cabling. This arrangement permits communications between the base station and a plurality of remote transceivers to occur concurrently on the same frequency, but through different antennas.

Another smart antenna system is comprised of an array of antenna elements that are used to perform adaptive spatial processing. The system works by electronically forming RF beams and nulls by adjusting the phase and amplitude of each communication channel through each of the antennas in the array. Adaptive spatial signal processing applied to RF signals of each of the antenna elements permits RF energy to be focused to/from a specific direction to/from the same base station, thus reducing interference between remote communication devices on the same frequency that are spatially separated.

Smart antennas have been applied to support spatial division multiple access (SDMA) systems for improving spectral efficiency. These systems make use of the spatial separation of remote communication devices enabling multiple remote devices to communicate with an SDMA base station on the same frequency. SDMA can be implemented using adaptive antenna systems or switched beam systems.

Much study has been performed to apply SDMA to mobile networks; however, thus far in practice, SDMA systems have been limited to fixed wireless networks, such as wireless local loop (WLL) systems, due to the tremendous computation power required to track a large number of mobiles and monitoring spatial separation of those on the same frequency to prevent unacceptable degradation in signal quality.

Smart antennas have been applied to improve spectral efficiency by reduction of interference allowing higher frequency reuse across a mobile network. Each cell in a cell cluster may use unique RF frequencies for that cell; however, those RF frequencies may be reused in cells of another cell cluster. By reducing interference through the use of smart antennas, cells of different clusters using the same frequencies may be placed geographically closer, allowing those frequencies to be used more often, thus improving spectral efficiency.

Hence, in a network making use of frequency translating repeaters, what is needed is a mobile communication system that can take advantage of existing smart antenna technology for more efficient use of frequency spectrum, in particular the loss of spectral efficiency due to the use of backhaul communication channels.

SUMMARY OF THE INVENTION

The invention concerns a method and system for implementing a more spectrally efficient wireless communication system that includes a plurality of base stations communicating indirectly with a plurality of wireless communications devices through a plurality of repeaters. The method can generally comprise communicating indirectly between a first base station and a wireless communication device using a first repeater and a first RF backhaul link. A control processor associated with the first base station can control a first smart antenna system. The system selectively configures the first smart antenna system to spatially isolate communications on the first RF backhaul from communications on a second RF backhaul of a second repeater.

The first base station can communicate with a second wireless communication device using the second repeater and the second RF backhaul link. Alternatively, the second repeater can communicate with a second base station located in a communication cell separate from the first base station. In the latter case, the method can further include the steps of selectively controlling a second smart antenna system of the second base station for improved spectral efficiency. Specifically, this can be accomplished by selectively configuring the second smart antenna system to spatially isolate communications on the second RF backhaul link from communications on the first RF backhaul link.

The controlling step mentioned above can include the step of selecting from an antenna array at least one antenna element for use by the first base station in producing a directional antenna pattern having a major lobe in the direction of the first repeater. According to one embodiment, the controlling step can further comprise selecting a plurality of antenna elements from the antenna array for use by the first base station and adjusting phase and/or amplitude of RF signals received and transmitted by the plurality of antenna elements to produce the directional antenna pattern. Similarly, the controlling step can involve selecting a plurality of antenna elements from the antenna array for use by the base station and adjusting at phase and/or amplitude of RF signals received and transmitted by the plurality of antenna elements to produce a null in the directional antenna pattern. For example, the null can be selectively directed toward the second repeater.

According to an alternative embodiment, the invention can comprise a first base station configured for communicating indirectly with a wireless communication device using a first repeater and a first RF backhaul link. The base station can include a first smart antenna system operatively associated with the first base station. The first smart antenna system can be selectively configured by a control processor for spatially isolating communications on the first RF backhaul from communications on a second RF backhaul of a second repeater. The first base station can communicate with a second wireless communication device using the second repeater and the second RF backhaul link. Alternatively, the second repeater can be arranged for communicating with a second base station located in a communication cell separate from the first base station.

The second base station can comprises a second control processor for selectively controlling a second smart antenna system of the second base station. The second smart antenna system can be arranged for spatially isolating communications on the second RF backhaul link from communications on the first RF backhaul link. The control processor can select from an antenna array at least one antenna element for use by the first base station. According to one aspect of the invention, the antenna element or elements can be used to produce a directional antenna pattern having a major lobe in the direction of the first repeater.

According to another aspect of the invention, the control processor can select a plurality of antenna elements from the antenna array for use by the first base station. In that case, the first smart antenna system can include phase and amplitude controllers for adjusting at least one of a phase and amplitude of RF signals received and transmitted by the plurality of antenna elements to produce the directional antenna pattern. Similarly, the control processor can select a plurality of antenna elements from the antenna array for use by the first base station and the first smart antenna system can include phase and amplitude controllers for adjusting phase and/or amplitude of RF signals received and transmitted by the plurality of antenna elements to produce a null in the directional antenna pattern. The null can be selectively directed toward the second repeater.

BRIEF DESCRIPTION OF THE DRAWINGS

There are presently shown in the drawings embodiments, which are presently preferred, it being understood, however, that the invention is not limited to the precise arrangements and instrumentalities shown.

DETAILED DESCRIPTION OF THE PREFERRED EMBODIMENTS

Figure 1:
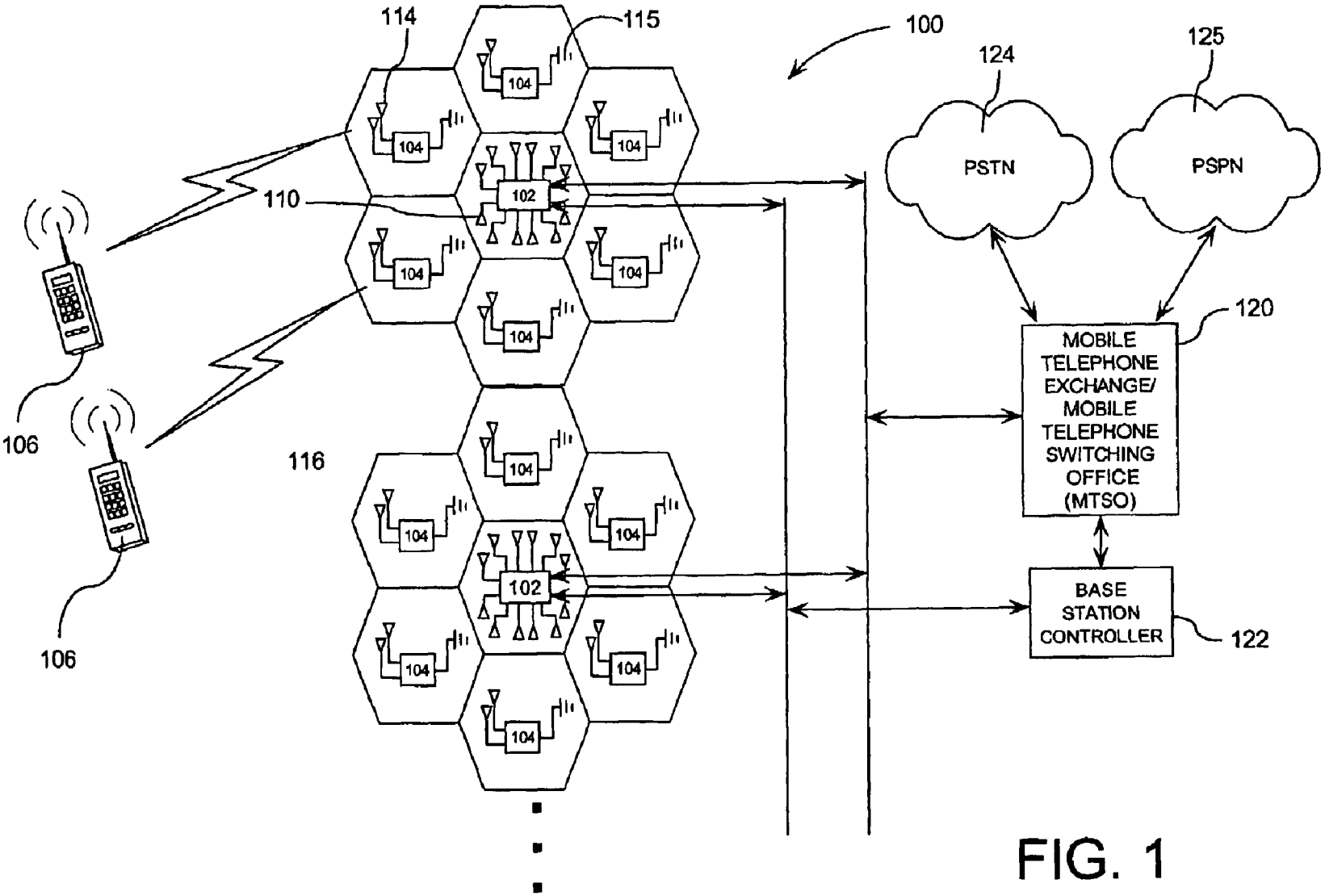
FIG. 1 shows a simple diagram of a mobile communications network incorporating a base station and repeaters.

FIG. 1 is diagram of a mobile communications network 100 incorporating base stations 102, repeaters 104, and mobile communication devices 106. Generally, base stations 102 can facilitate communication among mobile communication devices 106 and between mobile communication devices 106 and other data networks, for example a public switched telephone network (PSTN) 124 or a public switched packet network (PSPN) 125. Signals communicated to and from a PSTN or PSPN pass through a mobile telephone switching office (MTSO) 120. Base stations 102 can receive communication signals from MTSO 120 and modulate the signals to format them for transmission through base station antennas 110. Base stations 102 can also receive signals transmitted to base station antennas 110 from repeaters 104, or mobile communication units 106. These signals are communicated to the MTSO 120. Base station controller 122 can incorporate a management application to manage the operations of a plurality of base stations 102.

Base stations 102 conventionally communicate with mobile communication devices 106 via groundlinks. By itself, a base station 102 can only cover a limited area with groundlinks. This limited coverage area is referred to in the art as a cell. Hence, repeaters 104 are typically placed in cells outside the reach of a base station's groundlink to expand the base station's service to cover those cells. A group of cells covered by a base station 102 and its associated repeaters 104 is referred to in the art as a cell cluster.

Repeaters 104 can receive communications transmitted from a corresponding base station 102 over a backhaul link and can forward the communications to mobile communication devices 106 through antennas 114. Likewise, repeaters 104 can receive communications transmitted from mobile communication devices 106 and forward these communications to the corresponding base station 102 over the backhaul link through antennas 115.

According to a preferred embodiment of the invention, base station 102 can incorporate suitable hardware and software for implementing smart antenna processing. Such processing can permit a single frequency to be used for implementing multiple backhaul links between a base station 102 and multiple repeaters 104, or for improved frequency re-use in a system of base stations making use of such smart antennas for implementing repeater backhaul links. Implementing multiple repeater backhaul links on the same RF frequencies, either within a cell or among a group of cells, can be highly advantageous as it increases the available bandwidth for ground link communications with mobile communication devices 106.

Figure 2:
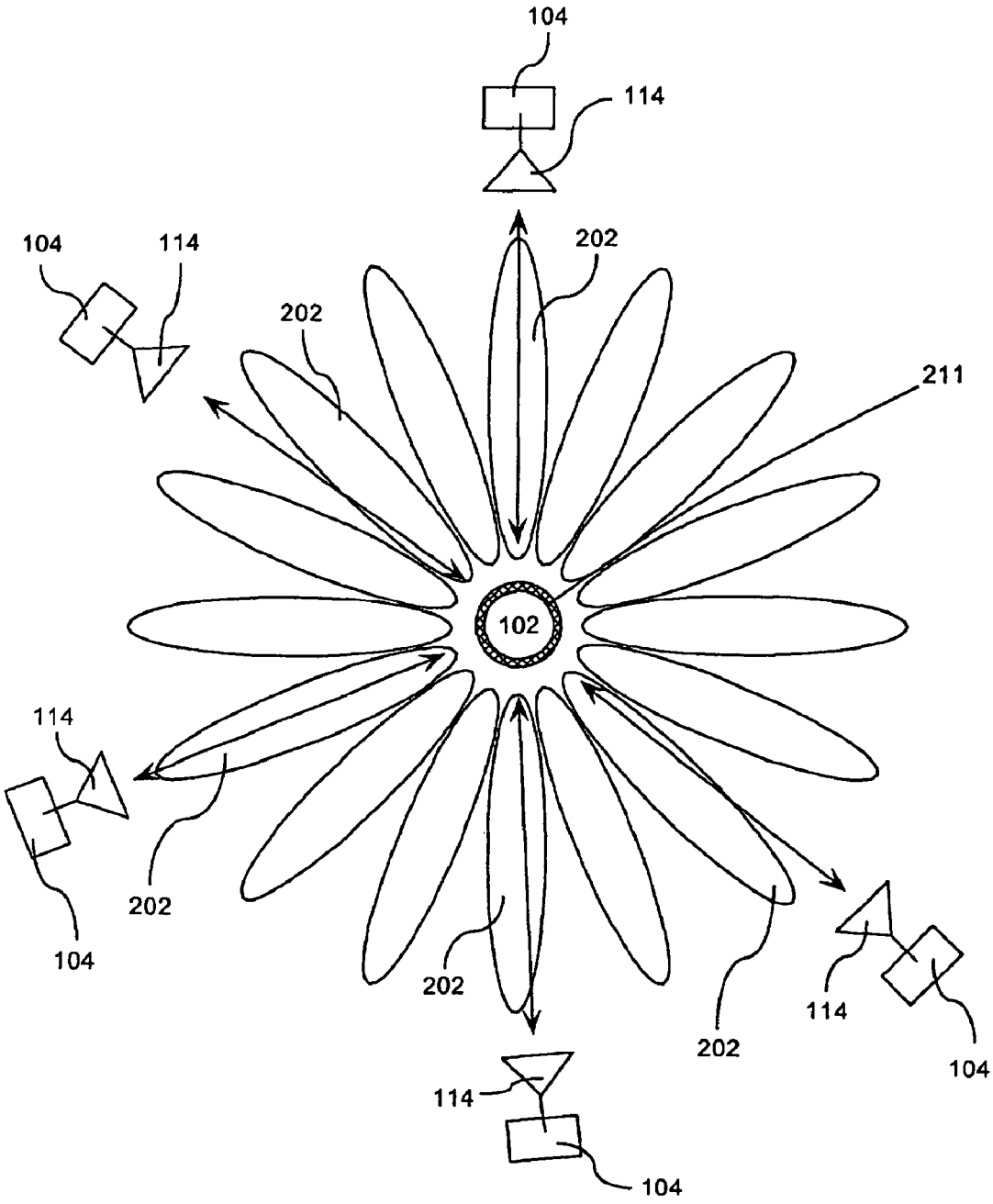
FIG. 2 shows a base station using a switched-beam antenna array to communicate with multiple repeaters simultaneously.

Smart antenna processing systems as described herein can include switched-beam antenna systems, adaptive antenna processing, or any other system incorporating special processing techniques to focus antenna propagation patterns for reducing co-channel or adjacent channel interference. FIG. 2 shows a base station 102 that incorporates a conventional switched-beam antenna array 211 for communication with mobile units 106 and repeaters 104. The switched-beam antenna array 211 comprises 16 antenna elements, each having a 22.5 degree beamwidth, so as to cover a 360 degree propagation angle. However, those skilled in the art will appreciate that the invention is not limited in this regard. Rather, the switched-beam antenna array 211 can comprise any other desired arrangement of multiple narrow beam antennas, each with an individual antenna pattern 202 covering a narrow azimuth region. As is conventional in such systems, each switched beam antenna associated with antenna array 211 requires a dedicated transceiver and a transmit amplifier together with associated RF cabling. This arrangement permits a base station to communicate with one or more remote repeaters on the same backhaul frequency without substantial interference. It can also permit base stations in a cell cluster to have improved levels of frequency reuse by allowing a common set of backhaul frequencies to be used more often by different base stations within the cell cluster.

In addition to providing concurrent communications with multiple repeaters on a single backhaul frequency, the arrangement in FIG. 2 can also be used to concurrently permit groundlink communications on the same frequency between a base station 102 and a mobile communication unit 106. Groundlink communications with a mobile transceiver unit 106 can be switched from one antenna element to another as the mobile communication unit 106 moves from a region covered by one antenna element to a region covered by another antenna element.

Figure 3:
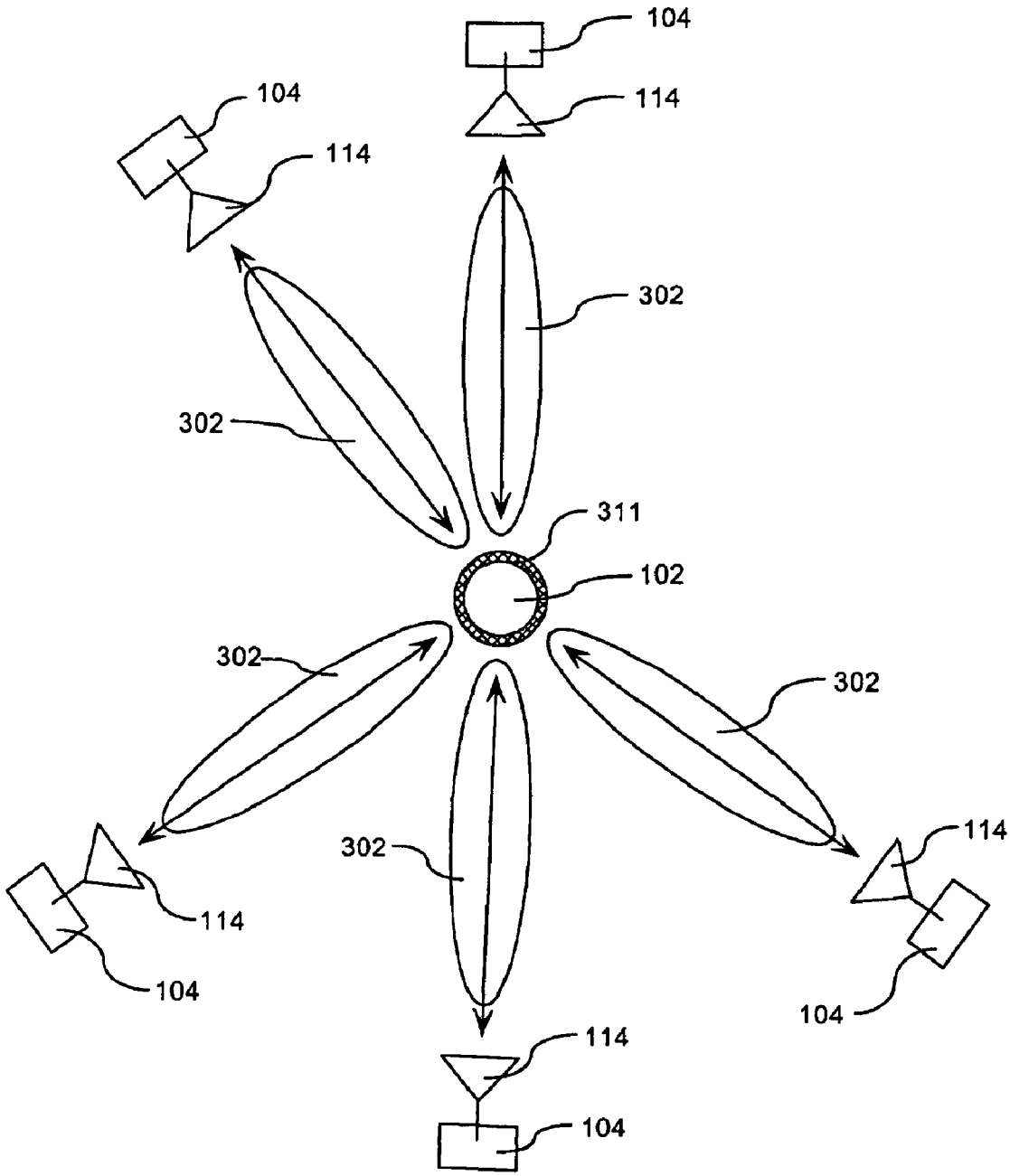
FIG. 3 shows a base station using and adaptive antenna array to communicate with multiple repeaters simultaneously.

FIG. 3 illustrates an adaptive antenna type system according to an alternative preferred embodiment in which adaptive spatial processing is used to define and steer antenna patterns 302. The geometry of the adaptive array determines spatial resolution of the signals transmitted or received, i.e. the amount of coverage in a given spatial region. Commonly used adaptive array types are the uniform linear and circular arrays. For any given geometry, the phases and amplitudes of the currents exciting the array elements as well as the number of array elements determine the transmission power of the array in a certain direction. The phases and amplitudes of the currents on the antenna array elements can be electronically adjusted using amplitude and phase controllers such that transmitted signals in a certain direction add in phase, and maximum power is directed in that direction. Due to the reciprocal nature of adaptive antennas, this approach is also generally applicable to enhance the receive gain of an antenna array in a particular direction as well.

The embodiment of FIG. 3 is similar to that of FIG. 2 except that use of the adaptive antenna techniques as opposed to switched-beam antennas makes the angular positioning of the repeaters 104 around the base station 102 less critical. More particularly, since adaptive array processing permits provides greater flexibility in directing the antenna pattern 302 in a particular direction as compared to switched-beam antennas, there is greater flexibility in the positioning of the repeaters. Adjacent repeaters 104 need only be separated enough so that each major lobe pattern 202 does not significantly overlap any two or more repeaters using the same frequency. Adaptive spatial processing has the further advantage in this context of permitting the antenna array to create RF nulls in the direction of interfering co-channel signals operating on the same frequency. This reduces the strength of undesired signals interfering with RF received from a desired repeater. In any case the adaptive antenna array 311 can permit base station 102 to communicate with multiple repeaters 104 on a same backhaul frequency at the same time without significant interference between the signals. It can also allow multiple base stations, which are nearby to one another to communicate with multiple repeaters on a same backhaul frequency.

Figure 4:
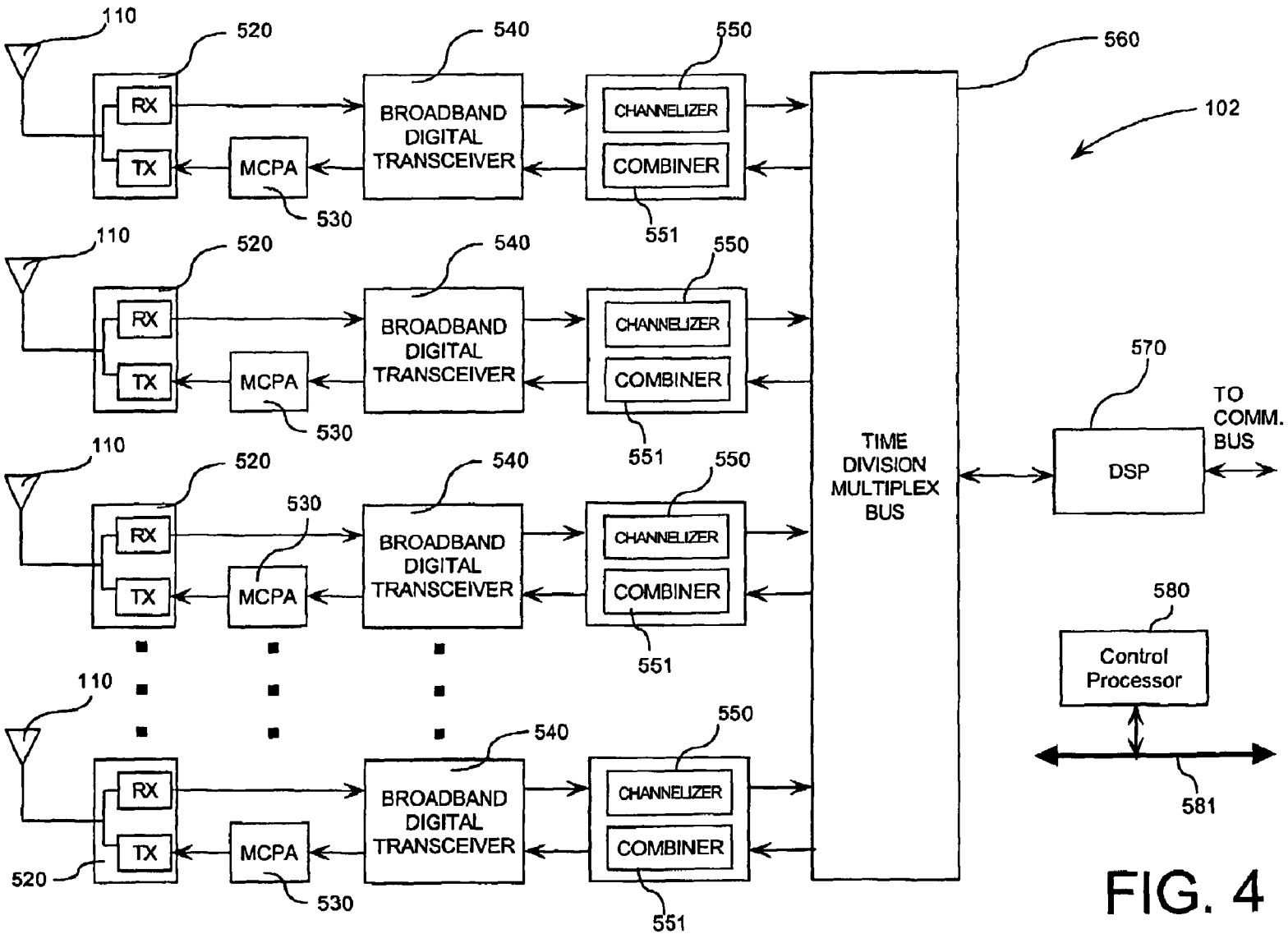
FIG. 4 shows a simplified block diagram of a base station incorporating smart antennas.

Referring to FIG. 4, base station 102 can have a selected number of antenna elements 110 in a switched-beam or adaptive array antenna system. Each antenna element has a dedicated receive apparatus chain comprising duplexer 520, broadband digital transceiver 540, and a channelizer/combiner 550 (including analog to digital converter). A suitable interface such as time division multiplex bus 560 can be provided for facilitation communications between the dedicated receive apparatus chain and digital signal processor board (DSP) 570. The DSP 570 can provide signal processing, for example beam forming (in the case of adaptive array processing), antenna selection (in the case of switched-beam antenna processing), signal modulation, signal calibration, etc. DSP 570 can include a plurality of individual digital signal processors for performing these tasks for each channel.

For transmission, each antenna element 110 has a dedicated transmit apparatus chain comprising duplexer 520, multi-carrier power amplifier (MCPA) 530, broadband digital transceiver 540, combiner 551 (including digital to analog coverter), time division multiplex bus 560, DSP 570, and associated connectors inclusive. Similar to its function on the receive path, DSP 570 can perform antenna switching or adaptive array beam forming. DSP 570 can also apply any other desired signal processing to the transmit signals, for example switching transmit signals between antenna elements when transmitting through a switched-beam antenna array.

A control processor 580 can be provided for controlling the operation of the major system components including the bus 560, and each channelizer 550, combiner 551, broadband digital transceiver 540, MCPA 530. The control processor can communicate with these system components using a control bus 581. Where a switched-beam antenna system is used, the control processor 580 can select one or more antennas 110 to operate exclusively with each of the plurality of repeaters 104, where each antenna or combination of antennas can having an antenna pattern 202 comprising a major lobe exhibiting gain in a direction of one of the repeaters 104. RF signals communicated to and from the base station 102 for each of the plurality of repeaters 104 can be processed separately in one of the plurality of the transceivers 540 associated with each of the antennas.

Alternatively, where an adaptive array approach is used, the control processor 580 can adjusts a phase, amplitude or both for RF signals associated with all of the plurality of antennas of the antenna array. These operations can be performed in the channelizer and combiner blocks or within DSP 570. In this way the system can combine the RF signals to create an antenna pattern 302 comprising a major lobe exhibiting gain in a direction of one of the plurality of repeaters 104. The control processor 580 can also adjust a phase and/or amplitude of RF signals associated with each of the plurality of antennas 110 of the antenna array for combining the RF signals to create an antenna pattern comprising nulls in the direction of at least one other of the plurality of repeaters concurrently operating on the common RF carrier frequency.

It should be understood that the examples and embodiments described herein are for illustrative purposes only and that various modifications or changes in light thereof will be suggested to persons skilled in the art and are to be included within the spirit and purview of this application. The invention can take many other specific forms without departing from the spirit or essential attributes thereof for an indication of the scope of the invention.

We claim:

1. In a wireless communication system with a plurality of base stations communicating indirectly with a plurality of wireless communications devices, a method for more efficient use of radio spectrum, comprising:

communicating indirectly between a first base station and a wireless communication device using a first repeater and a first RF backhaul link between said first repeater and said first base station;

controlling a first smart antenna system of said first base station for improved spectral efficiency by selectively configuring said first smart antenna system to spatially isolate communications on said first RF backhaul link from communications on a second RF backhaul link of a second repeater operating on [the] *a* same RF carrier frequency as [the] *said* first RF backhaul link.

2. The method according to claim 1 wherein said communicating step further comprises said first base station communicating with a second wireless communication device using said second repeater and said second RF backhaul link.

3. The method according to claim 1 wherein said second repeater communicates with a second base station located in a communication cell separate from said first base station.

4. The method according to claim 3 further comprising selectively controlling a second smart antenna system of said second base station for improved spectral efficiency by selectively configuring said second smart antenna system to spatially isolate communications on said second RF backhaul link from communications on said first RF backhaul link.

5. The method according to claim 1 wherein said controlling step further comprises selecting from an antenna array at least one antenna element for use by said first base station in producing a directional antenna pattern having a major lobe in the direction of said first repeater.

6. The method according to [claim 5] *claim 1* wherein said controlling step further comprises selecting a plurality of antenna elements from [said] *an* antenna array for use by said first base station and adjusting at least one of a phase [and] *or an* amplitude of RF signals received and transmitted by said plurality of antenna elements to produce [said] *a* directional antenna pattern.

7. The method according to [claim 5] *claim 1* wherein said controlling step further comprises selecting a plurality of antenna elements from [said] *an* antenna array for use by said *first* base station and adjusting at least one of a phase [and] *or an* amplitude of RF signals received and transmitted by said plurality of antenna elements to produce a null in [said] *a* directional antenna pattern, said null selectively directed toward said second repeater.

8. In a wireless communication system with a plurality of base stations communicating indirectly with a plurality of wireless communications devices through a plurality of repeaters, a system for providing more efficient use of radio spectrum, comprising:

a first base station configured for communicating indirectly with a wireless communication device using a first repeater and a first RF backhaul link between said first repeater and said first base station;

a first smart antenna system operatively associated with said first base station, said first smart antenna system selectively configured by a control processor for spatially isolating communications on said first RF backhaul link from communications on a second RF backhaul link of a second repeater operating on [the] *a* same RF carrier frequency as [the] *said* first RF backhaul link.

9. The system according to claim 8 wherein said first base station communicates with a second wireless communication device using said second repeater and said second RF backhaul link.

10. The system according to claim 8 wherein said second repeater communicates with a second base station located in a communication cell separate from said first base station.

11. The system according to claim 10 wherein said second base station comprises a second control processor for selectively controlling a second smart antenna system of said second base station for spatially isolating communications on said second RF backhaul link from communications on said first RF backhaul link.

12. The system according to claim 8 wherein said control processor selects from an antenna easy at least one antenna element for use by said first base station, and said at least one antenna element produces a directional antenna pattern having a major lobe in the direction of said first repeater.

13. The system according to [claim 12] *claim 8* wherein said control processor selects a plurality of antenna elements from [said] *an* antenna array for use by said first base station and said first smart antenna system includes phase and amplitude controllers for adjusting at least one of a phase [and] *or an* amplitude of RF signals received and transmitted by said plurality of antenna elements to produce [said] *a* directional antenna pattern.

14. The system according to [claim 12] *claim 8* wherein said control processor selects a plurality of antenna elements from [said] *an* antenna array for use by said first base station and said first smart antenna system includes phase and amplitude controllers for adjusting at least one of a phase [and] *or an* amplitude of RF signals received and transmitted by said plurality of antenna elements to produce a null in [said] *a* directional antenna pattern, said null selectively directed toward said second repeater.

*15. A method comprising:*

*communicating on a first backhaul link having a first RF carrier frequency and a first directional antenna pattern; and*

*communicating on a second backhaul link having a second RF carrier frequency and a second directional antenna pattern;*

*wherein said first RF carrier frequency is equal to said second RF carrier frequency and,*

*wherein said first directional antenna pattern is sufficiently different from said second directional antenna pattern that communications on said first backhaul link are isolated from communications on said second backhaul link.*

*16. The method according to claim 15 wherein said second backhaul link is directed to a communication cell separate from said first backhaul link.*

*17. The method according to claim 15 wherein said first directional antenna pattern is produced by selecting a plurality of antenna elements from an antenna array and adjusting at least one of a phase or an amplitude of RF signals received and transmitted by said plurality of antenna elements.*

*18. The method according to claim 15 wherein said first directional antenna pattern is further configured to produce a null in said first directional antenna pattern such that communications on said first backhaul link are isolated from communications on said second backhaul link.*

*19. A system, comprising:*

*a first base station configured for communicating on a first RF backhaul link;*

*a first smart antenna system operatively associated with said first base station, said first smart antenna system selectively configured by a control processor for spatially isolating communications on said first RF backhaul link from communications on a second RF backhaul link operating on a same RF carrier frequency as said first RF backhaul link.*

*20. The system according to claim 19 wherein said second backhaul link is directed to a communication cell separate from said first backhaul link.*

*21. The system according to claim 19 wherein said control processor selects from an antenna array at least one antenna element for use by said first base station, the said at least one antenna element produces a directional antenna pattern.*

*22. The system according to claim 19 wherein said control processor selects a plurality of antenna elements from an antenna array for use by said first base station and said first smart antenna system includes phase and amplitude controllers for adjusting at least one of a phase or an amplitude of RF signals received and transmitted by said plurality of antenna elements to produce a directional antenna pattern.*

*23. The system according to claim 19 wherein said control processor selects a plurality of antenna elements from an antenna array for use by said first base station and said first smart antenna system includes phase and amplitude controllers for adjusting at least one of a phase or an amplitude of RF signals received and transmitted by said plurality of antenna elements to produce a null in an directional antenna pattern.*

* * * * *

UNITED STATES PATENT AND TRADEMARK OFFICE

CERTIFICATE OF CORRECTION

PATENT NO. : RE42,605 E
APPLICATION NO. : 12/191866
DATED : August 9, 2011
INVENTOR(S) : Noll et al.

It is certified that error appears in the above-identified patent and that said Letters Patent is hereby corrected as shown below:

Column 8, line 33, in Claim 12, delete "easy" and insert -- array --.

Column 8, line 62, in Claim 15, delete "*frequency and*," and insert -- *frequency*, *and* --.

Signed and Sealed this
Fourteenth Day of February, 2012

David J. Kappos

David J. Kappos
*Director of the United States Patent and Trademark Office*